United States Patent [19]

Redelman

[11] Patent Number: 4,881,625
[45] Date of Patent: Nov. 21, 1989

[54] CONTROL VALVING FOR A HYDRAULIC RETARDER

[75] Inventor: James A. Redelman, Indianapolis, Ind.

[73] Assignee: General Motors Corporation, Detroit, Mich.

[21] Appl. No.: 211,623

[22] Filed: Jun. 27, 1988

[51] Int. Cl.$^4$ .................... F16D 57/06; B60K 41/20
[52] U.S. Cl. ................................ 188/290; 60/337; 192/4 B; 188/264 R; 188/296
[58] Field of Search ................... 188/290–296, 188/274, 264 E, 264 R, 264 D; 60/337, 347; 192/4 B, 12 A, 113 B; 74/846

[56] References Cited

U.S. PATENT DOCUMENTS

| | | |
|---|---|---|
| 3,592,304 | 7/1971 | Thompson ............... 188/264 D X |
| 3,696,893 | 10/1972 | Koivunen ................. 188/264 E |
| 3,774,734 | 11/1973 | Forster et al. ............... 188/296 |
| 3,774,735 | 11/1973 | Hanke et al. ............... 188/296 |
| 3,931,870 | 1/1976 | Memmer ................... 188/296 |
| 3,987,874 | 10/1976 | Fuehrer et al. ............. 188/296 |
| 3,989,127 | 11/1976 | Staudenmaier et al. ..... 60/347 X |
| 4,324,320 | 4/1982 | Spurlin et al. ............... 192/4 B |
| 4,432,442 | 2/1984 | Vogelsang .................. 188/290 |

*Primary Examiner*—Douglas C. Butler
*Attorney, Agent, or Firm*—Donald F. Scherer

[57] ABSTRACT

A control system for a hydraulic retarder includes an inlet regulator valve and an outlet regulator valve. The inlet regulator valve admits fluid to the retarder at a predetermined pressure. The outlet regulator valve prevents fluid flow from the retarder unless the main system pressure is greater than a predetermined value.

2 Claims, 1 Drawing Sheet

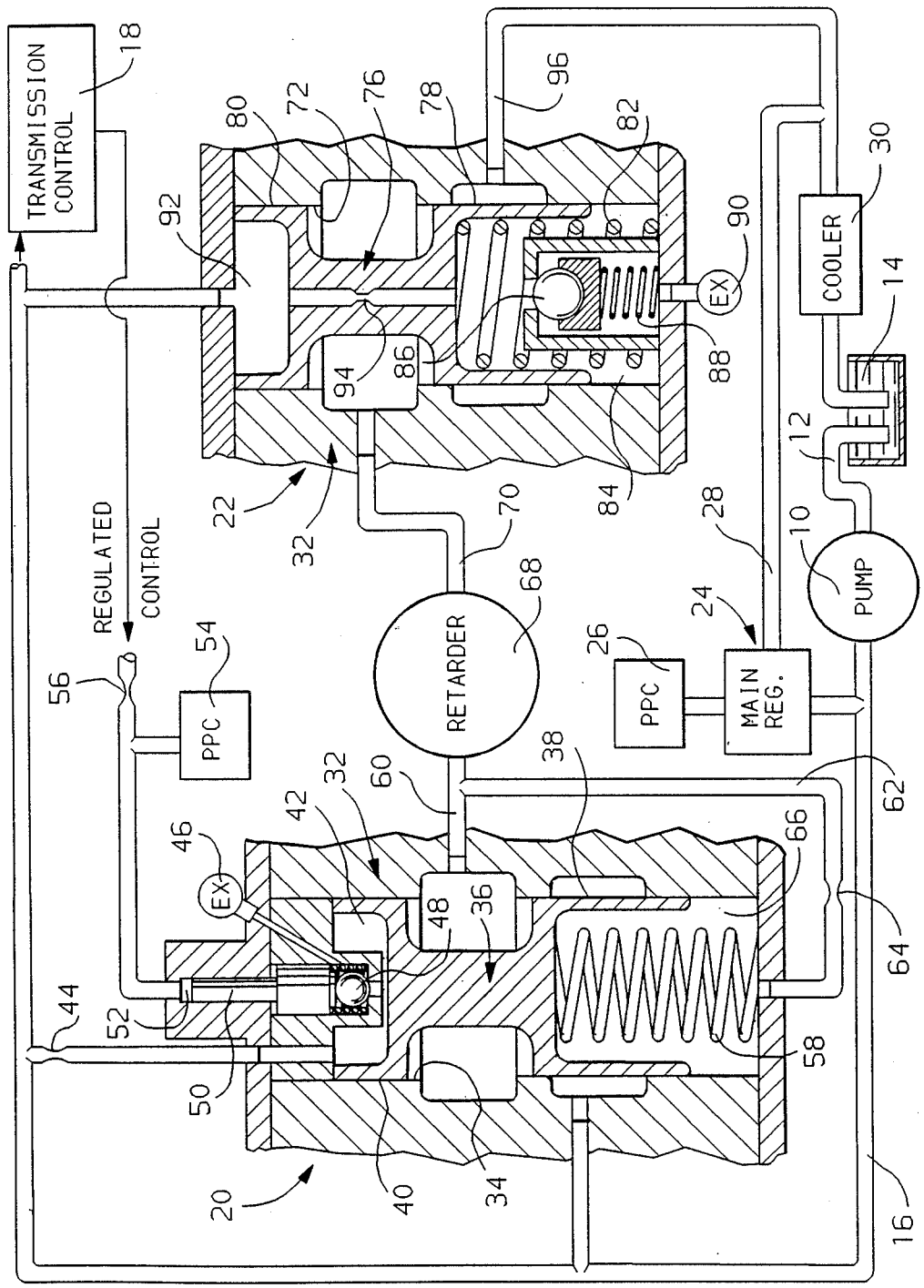

CONTROL VALVING FOR A HYDRAULIC RETARDER

The invention herein described was made in the course of work under a contract or subcontract thereunder with the Department of the Army.

BACKGROUND OF THE INVENTION

This invention relates to hydraulic control systems and more particularly to hydraulic control systems for hydraulic retarders.

Prior art retarder controls generally provide some means, such as an accumulator, for assisting the control pump in supplying fluid to the retarder at initiation. These systems have a high pressure discharge at the retarder outlet which is directed through a cooler and back to the retarder inlet to mix with retarder inlet flow from the pump. This reduces the pump requirement but retarder charge pressure and thus torque capacity is limited by the design strength of the cooler.

Other devices utilize an output driven pump, the main function of which is to supply the retarder with pressurized fluid. These systems also utilize flow recirculation so that the output pump flow requirements can be maintained at a minimum value. Therefore, these systems also limit retarder charge pressure to cooler pressure capacity.

SUMMARY OF THE INVENTION

The present invention allows the benefit of a higher pressure inlet to the retarder but reduces the discharge pressure downstream from the retarder control and therefore provides a low pressure at the cooler inlet. Also, the control system prevents flow from the retarder when the overall transmission control system is below a predetermined pressure. Therefore, the retarder will not consume pressurized fluid from the control pump to the detriment of the transmission control system.

It is therefore an object of this invention to provide an improved hydraulic retarder control system for providing a high operating pressure for high torque capacity and a low output pressure for the cooling circuit.

It is another object of this invention to provide an improved hydraulic retarder control wherein an inlet valve is supplied by a main control pump and is effective to control the retarder inlet fluid at a predetermined pressure level and also wherein an outlet control valve is provided which prevents fluid flow from the retarder unless the overall system pressure is above a predetermined pressure level, and further wherein the output flow from the outlet control valve is at a low pressure and is connected with a cooler.

It is a further object of this invention to provide an improved high pressure, high torque capacity retarder and control wherein the retarder feed is directed from the system main high pressure circuit through an inlet valve which maintains an independent charge pressure and an outlet valve which prevents flow from the retarder when the system main pressure is below a predetermined value and also directs all excess flow from the main system through the retarder, during braking, to a low pressure cooler.

These and other objects and advantages of the present invention will be more apparent from the following specification and drawing.

DESCRIPTION OF THE DRAWING

The drawings is a diagrammatic representation of an exemplary embodiment of the present invention.

DESCRIPTION OF THE EMBODIMENT

The control system and retarder is shown diagrammatically in the drawing. There is included in the control, a main pump 10 which draws fluid through a passage 12 from a reservoir 14 and delivers pressurized fluid via a passage 16 to a transmission control 18, an inlet regulator valve 20, an output regulator valve 22 and a main regulator valve 24.

The main regulator valve 24 is a conventional pilot operated regulator valve which is controlled by a proportional pressure solenoid. When the main pump 10 is operating at the pressure level established by the regulator valve 24 during normal operation, excess fluid flow is directed via passage 28 through a cooler 30 to the reservoir 14. The operating pressure of the main regulator valve 24 is maintained at a level sufficient to operate the various mechanisms within the transmission proper which is not shown.

These mechanisms, as is well known, include fluid operated brakes and clutches as well as a plurality of control valves such as shift control valves, governor valves and throttle control valves. The transmission may also include a number of accumulators which are effective to control shift timing within the transmission. These mechanisms are conventional and are well known to those familiar with the power transmission art. Thus, depicting a more complete description of these mechanisms is not believed necessary at this point.

The inlet regulator valve 20 is disposed in a valve body 32 and is comprised of a valve bore 34 in which is slidably disposed a valve spool 36 having spaced lands 38 and 40. The inlet regulator valve 20 also has a pilot chamber 42 which is in fluid communication with passage 16 through a restriction or orifice 44. The chamber 42 is in controlled communication with an exhaust passage 46 by a ball valve 48. The ball valve 48 is controlled by a plunger 50 which in turn is controlled by a pressure in chamber 52.

The pressure in chamber 52 is established by a proportional pressure control solenoid 54. The fluid pressure controlled by solenoid 54 is supplied from the transmission control 18 through a restriction 56. The solenoid 54 is operable to control the pressure at chamber 52 by determining the amount of fluid exhausted through the solenoid 54. Chamber 52 controls the force imposed on the ball valve 48 and therefore the pressure available in chamber 42.

When a braking or vehicle retardation command is given by the operator, the pressure in chamber 52 will be raised sufficiently such that the pressure in chamber 42 will increase to impose a downward force on the valve spool 36 to cause movement thereof against a control spring 58. When the valve spool 36 is moved sufficiently downward in the bore 34, fluid in passage 16 will flow between lands 38 and 40 to a retarder inlet passage 60. The retarder inlet passage 60 is connected through a branch 62 and restriction 64 to a chamber 66 which surrounds spring 58. The pressure in chamber 66 cooperates with the spring 58 and urges the spool valve 36 upward to discontinue fluid communication between passages 16 and 60 when the desired pressure is achieved in passage 60. When the pressure in passage 60 decreases, the valve 20 will reopen to repeat the cycle.

In normal retardation operation, at least a small amount of continuous flow will occur in passage 60 so that the valve 20 will remain slightly open.

The retarder inlet passage 60 is in fluid communication with a conventional hydraulic retarder mechanism 68. The retarder 68 is essentially a vaned hydrodynamic device having at least one rotary member and one stationary member. The fluid supplied via passage 60 is churned between these members and since the rotary member is connected to the vehicle output, vehicle retardation is effected. These devices are conventional and are utilized in many commercially available vehicles such that a more complete description is not believed necessary.

Fluid is discharged from the retarder 68 through an outlet passage 70 which is in fluid communication with the output regulator valve 22. The output regulator valve 22 includes a valve bore 72 formed in the valve body 32 and a valve spool 76 having spaced lands 78 and 80 slidably disposed in the valve bore 72. The valve spool 76 is urged upwardly in the bore 72 by a spring 82. The spring 82 is disposed in a chamber 84 and in which is also assembled a pilot ball valve 86. Ball valve 86 is urged by a spring 88 to close the chamber 84 from exhaust passage 90.

The end of valve spool 76 opposite the chamber 84 is in fluid communication with the passage 16. Fluid pressure in passage 16 enters a chamber 92 formed at the one end of spool 76 and passes through a restrictive passage 94 to the chamber 84. The chamber 84 is therefore supplied from the passage 16.

Presuming that the ball valve 86 is maintained on its seat by spring 88, the pressure in chambers 92 and 84 will be balanced and the spring 82 will position the valve spool 76 as shown in the drawing. If the pressure in chamber 84 becomes sufficient to open the pilot valve 86, some fluid will flow from the chamber 84 to exhaust 90. When this fluid flow becomes sufficient to cause a pressure drop through the restriction passage 94, a resultant downward force occurs on the valve spool 76. When this force is sufficient to overcome the force n spring 82, the valve spool 76 will move downward permitting fluid communication between the retarder outlet passage 70 and a return passage 96 which is connected with the cooler 30.

Whenever retardation is called for by the operator, the main pilot solenoid 26 for the main regulator is established such that the main regulator 24 requires a significantly higher pressure before system relief is attained. As previously mentioned, when retardation is requested, the inlet valve 20 will function to send fluid to the hydraulic retarder 68. With this, retardation of the vehicle begins. If the pressure in passage 16 should undergo a supply decrease, the valve 22 will remain closed. However, when the retarder is filled and the transmission control 18 is satisfied, the discharge pressure from pump 10 will begin to rise. When this occurs, the pilot valve 86 in the output regulator valve 22 will open thereby permitting controlled flow from the retarder 68. The outlet flow from the retarder 68 enters passage 96 at a low pressure and is directed through the cooler 30.

If the transmission control 18 for some reason instantaneously requires more fluid flow (i.e. a downshift occurs), a slight decrease in system pressure will cause the valve 22 to close such that all fluid from pump 10 is delivered to the transmission control to satisfy the system demand at that instant. These system demands are short lived so that the flow at retarder 68 is not stagnated for any significant time.

It should be appreciated that the inlet pressure to the retarder is controlled by the valve 20 and that this pressure may be at a value at or below the system pressure in passage 16 as determined by the solenoid 54. The system pressure in passage 16 during vehicle retardation, is established by the outlet regulator valve 22. Generally, the pressure in passage 60 is designed to be less than the maximum system pressure as determined by the valve 22.

Since the valve 22 is the system regulator, excess fluid flow from pump 10 must be returned to reservoir 14 through the passage 96 and cooler 30. Granted there will be some leakage within the system, however, this leakage is insignificant compared to the total system flow. The pressure at which the valve 22 will open is controlled by the ball valve 86 as previously described. Therefore, the ball valve 86 in effect controls the overall transmission pressure system during vehicle retardation. This ball valve 86 has been depicted as a fixed pressure level type pilot valve. However, those familiar with hydraulic controls will recognize that a variable pressure pilot can be utilized and, if desired, can be constructed in the manner similar to the pressure control utilized for ball valve 48.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in hydraulic retarder cooling and torque capacity in a hydraulic transmission having a source of fluid pressure; a main pressure regulator for normally maintaining the pressure level of said source; a hydraulic retarder; means for controlling the operation of said retarder; and cooler means for cooling the fluid wherein the improvement comprises: inlet valve means for controlling inlet fluid flow to said retarder; outlet valve means for controlling the outlet fluid flow from the retarder to the cooler, said outlet valve means having control valve means in fluid communication with said source for preventing fluid outlet flow from said retarder when the fluid pressure of the source is below a predetermined level, and control valve means on said inlet valve means for controlling the inlet pressure to said retarder.

2. An improvement in hydraulic retarder cooling in a hydraulic transmission having a source of fluid pressure; a main pressure regulator for normally maintaining the pressure level of said source; a hydraulic retarder; means for controlling the operation of said retarder; and cooler means for cooling the fluid wherein the improvement comprises: inlet valve means for controlling inlet fluid pressure to said retarder; outlet valve means for controlling the outlet fluid flow from the retarder and for reducing the pressure prior to delivery to the cooler, said outlet valve means having control valve means in fluid communication with said source for preventing fluid outlet flow from said retarder when the fluid pressure of the source is below a predetermined level.

* * * * *